US011951340B2

(12) United States Patent
Wade

(10) Patent No.: US 11,951,340 B2
(45) Date of Patent: Apr. 9, 2024

(54) SYSTEM AND METHOD FOR EXTINGUISHING WILDFIRES FROM A DISTANCE USING SOUNDWAVES

(71) Applicant: John T Wade, Mobile, AL (US)

(72) Inventor: John T Wade, Mobile, AL (US)

( * ) Notice: Subject to any disclaimer, the term of this patent is extended or adjusted under 35 U.S.C. 154(b) by 118 days.

(21) Appl. No.: 17/521,782

(22) Filed: Nov. 8, 2021

(65) Prior Publication Data

US 2022/0143437 A1 May 12, 2022

Related U.S. Application Data

(60) Provisional application No. 63/111,473, filed on Nov. 9, 2020.

(51) Int. Cl.
*A62C 3/02* (2006.01)

(52) U.S. Cl.
CPC .......... *A62C 3/0207* (2013.01); *A62C 3/0271* (2013.01)

(58) Field of Classification Search
CPC ............................ A62C 3/0207; A62C 3/0271
See application file for complete search history.

(56) References Cited

U.S. PATENT DOCUMENTS

| | | | | |
|---|---|---|---|---|
| 2009/0184244 A1* | 7/2009 | Drews | A62B 3/00 | 250/330 |
| 2010/0059236 A1* | 3/2010 | Yee | A62C 2/00 | 169/46 |
| 2010/0203460 A1* | 8/2010 | Formigoni | F23C 99/003 | 431/2 |
| 2017/0259098 A1* | 9/2017 | Tran | A62C 3/00 | |
| 2018/0056103 A1* | 3/2018 | Hossameldin | A62C 99/009 | |
| 2019/0100311 A1* | 4/2019 | Yu | A01M 29/16 | |

* cited by examiner

*Primary Examiner* — Cody J Lieuwen
(74) *Attorney, Agent, or Firm* — AdamsIP, LLC; Edward Brinkley Garner, III; J. Hunter Adams

(57) ABSTRACT

A system and method for extinguishing wildfires with the assistance of soundwaves at a distance is provided. The system generally comprises a camera, output device, wave-guide, processor, power supply, and a non-transitory computer-readable medium having instructions stored thereon that instruct the processor to perform operations of the system. In one preferred embodiment, a database may be operably connected to the processor and store any data associated with a combustion reaction therein. In some preferred embodiments, the system may comprise a computing device having a user interface, which may present, to a user, data that may inform the user about a particular combustion reaction and/or allow the user to control the system remotely. The system and method are designed to safely stop wildfires without a resource that must be spent and subsequently replenished.

16 Claims, 7 Drawing Sheets

SYSTEM AND METHOD FOR EXTINGUISHING WILDFIRES FROM A DISTANCE USING SOUNDWAVES

FIELD OF THE DISCLOSURE

The subject matter of the present disclosure refers generally to a system and method for extinguishing wildfires with the assistance of soundwaves at a distance.

BACKGROUND

Wildfires are destructive, dangerous phenomenon that currently costs the United States billions of dollars each year. Unfortunately, climate change has increased the frequency in which large fires occur to the point that wildfires are occurring more often today than they did in the 400 years prior. Wildfires on the west coast have been particularly catastrophic as of late and have claimed the lives of several fire fighters every year. In fact, three of the four largest wildfires in California's recorded history occurred in 2020, so it is becoming increasingly obvious that preventative measures are not as effective as they once were. Additionally, the most currently used methods for extinguishing wildfires are inefficient and dangerous, and often involve using air-based vehicles to transport flame retardant chemicals and/or water to remote locations in order to prevent said wildfires from spreading to more populated areas. Therefore, new strategies and technologies must be employed to minimize the impact that inevitable yearly wildfires have on surrounding areas to protect life and property.

The primary issue existing methods of controlling wildfires all possess is that said methods rely on a component (such as water/flame retardant) that is used up and must be replenished before firefighters can reenter the fray and combat the growing wildfires. This gives the wildfires time to recover and ultimately makes it very difficult to contain them. There are known methods that can be used to reduce "flashover" of a fire—a transition phase in the development of a compartment fire in which surfaces exposed to thermal radiation reach ignition temperature more or less simultaneously and fire spreads rapidly throughout the space, resulting in full room involvement or total involvement of the compartment or enclosed space; however, those methods are currently difficult or impossible to use in the effectively in the field. The first known method that can be used to reduce flashover involves ventilating a space to remove superheated gases and fuel-laden air from said space, which is particularly difficult to accomplish in remote wilderness areas. The second method is to reduce the temperature of the space, which can be accomplished by cooling or by a reduction of the heat release rate. By combining this second method, using soundwaves as a heat reduction force, with more traditional firefighting techniques, it's possible to affect wildfires in a way that helps prevent the loss of life and property.

Accordingly, there is a need in the art for a system and method that manipulates the flashover probability and causes a heat reduction in a combustion reaction using soundwaves in order to more efficiently and safely stop wildfires without a resource that necessarily must be spent and subsequently replenished.

SUMMARY

A system and methods for extinguishing wildfires with the assistance of soundwaves at a distance is provided. The system and method are designed to safely stop wildfires without a resource that must be spent and subsequently replenished. In one aspect, the system collects image data and examines the flame height of a combustion reaction in order to determine if there has been a heat reduction. In another aspect, the system determines a flashover probability of a combustion reaction using environmental data. Generally, the system uses soundwaves to cause a heat reduction and/or to reduce the probability of a flashover in a combustion reaction in order to make the combustion reaction easier to control.

The system generally comprises a camera, output device, waveguide, processor, power supply, and a non-transitory computer-readable medium having instructions stored thereon that instruct the processor to perform operations of the system. In one preferred embodiment, a database may be operably connected to the processor and store any data associated with a combustion reaction therein. In some preferred embodiments, the system may comprise a computing device having a user interface, which may present, to a user, data that may inform the user about a particular combustion reaction and/or allow the user to control the system remotely. In other preferred embodiments, the system may comprise at least one sensor configured to collect environmental data that the processor may use to calculate heat reductions and flashover probabilities.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As used herein, the term "fire" and grammatical equivalents thereof are used herein to mean a combustion reaction using oxygen and a fuel source. For instance, a wildfire is a combustion reaction that uses oxygen and biomass, such as wood or grass.

Figure 1:
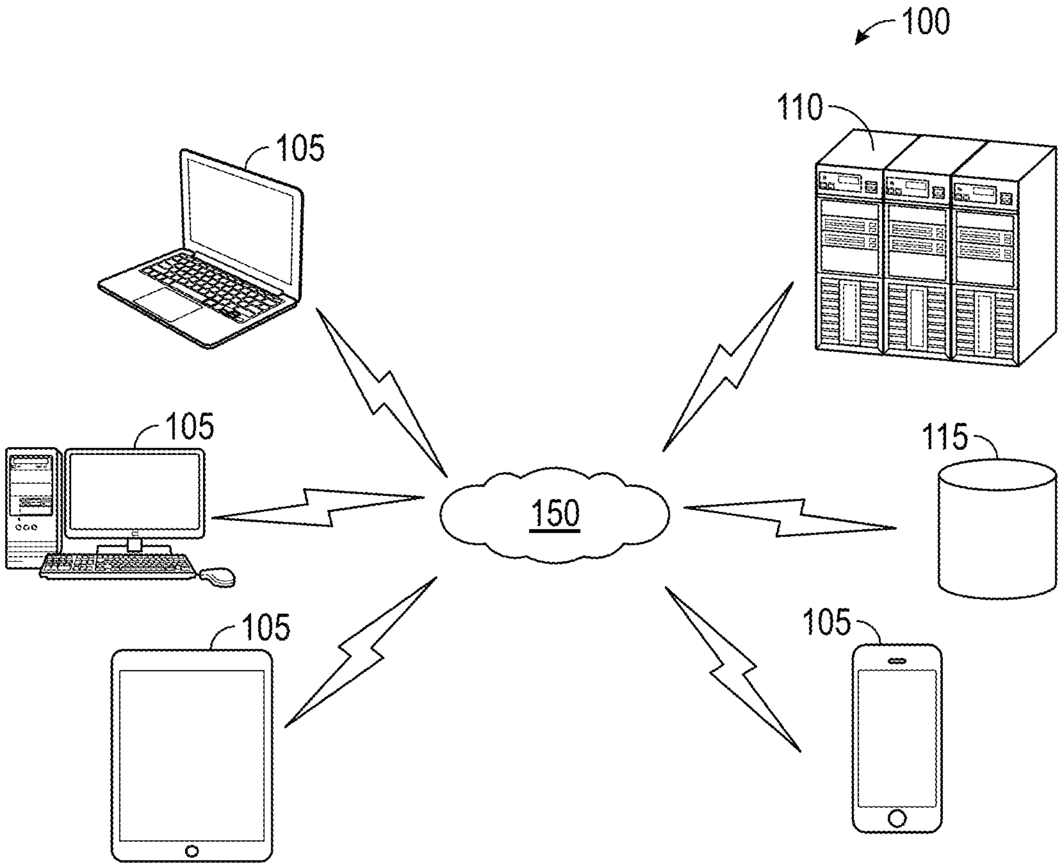
FIG. 1 illustrates a system in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
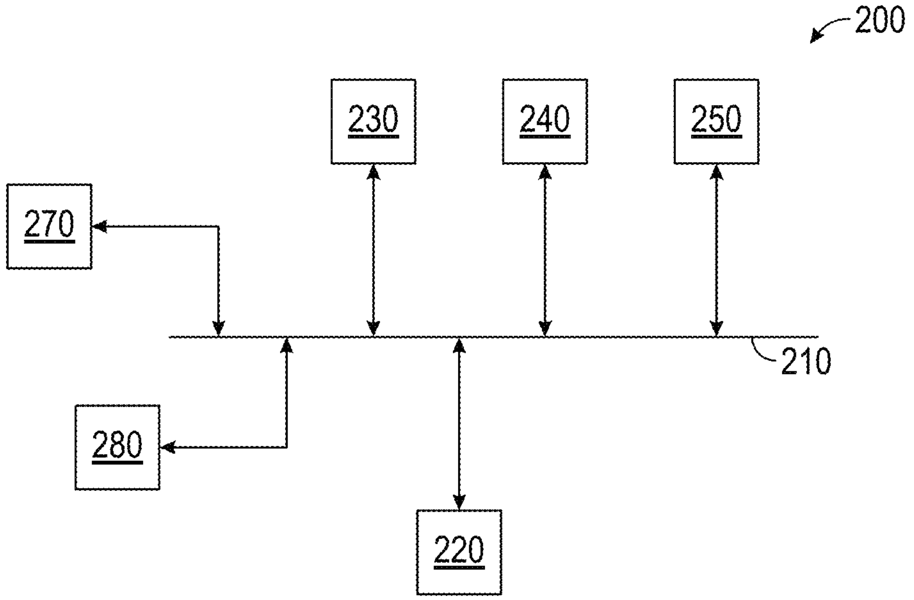
FIG. 2 illustrates a system in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing devices 300 and mobile computing devices 350, which are also computing entities 200, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data 440 from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. In a preferred embodiment, the system 400 may alter one of the frequency and intensity of a soundwave emitted and directed at a combustion reaction by the system 400 based on a difference in flame height 430B as determined by the processor 220.

The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device 418. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device 418 may be defined as a device that translates the electronic signals received from a computing entity 200 into a form intelligible to the user 405. An output device 418 of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer-readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
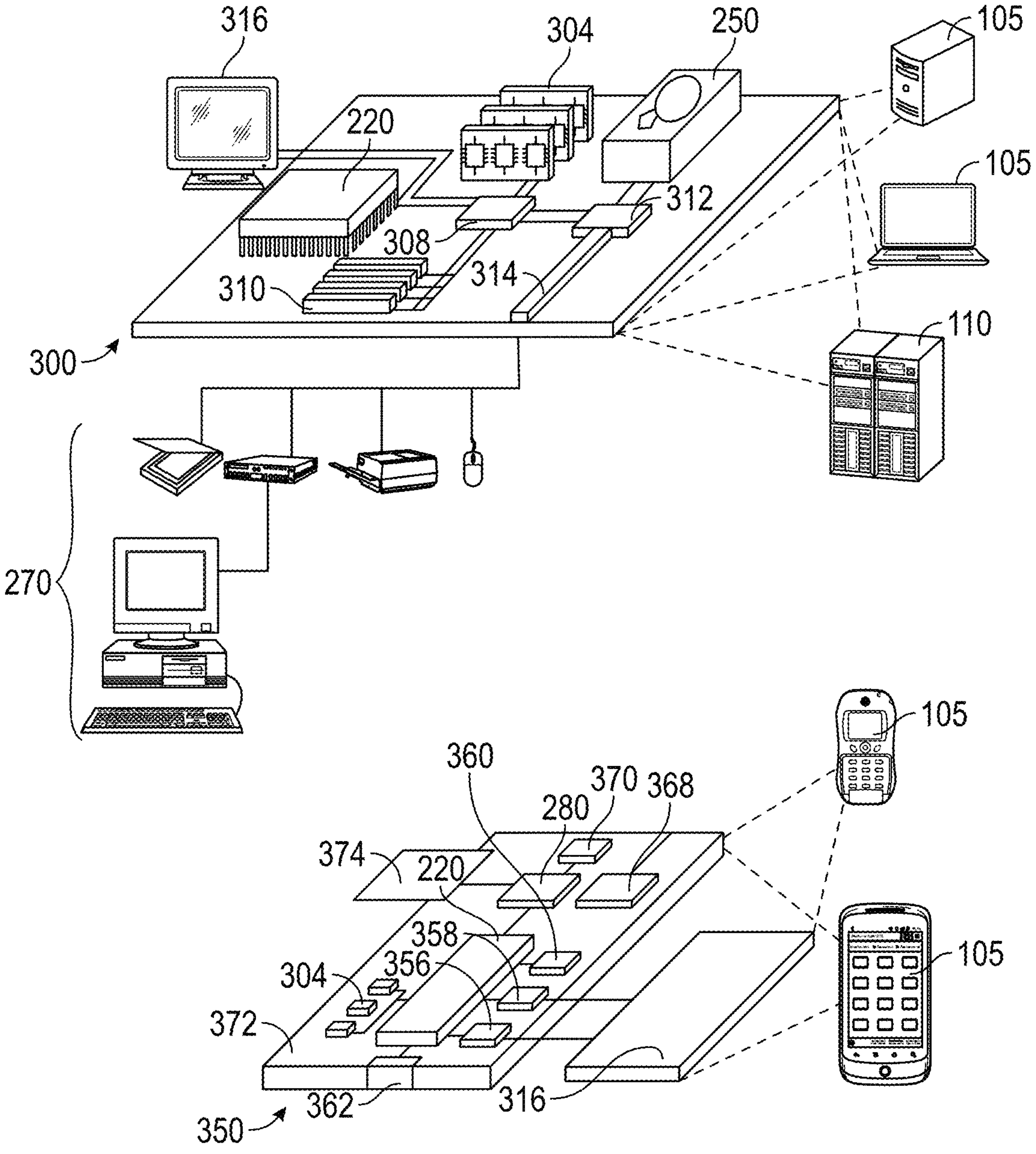
FIG. 3 illustrates a system in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device 418, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply 122. The power supply 122 may be any source of power that provides the system 400 with electricity. In one preferred embodiment, the system 400 may comprise of multiple power supplies 122 that may provide power to the system 400 in different circumstances. For instance, the system 400 may be directly plugged into a stationary power source, which may provide power to the system 400 so long as it remains in one place. In a preferred embodiment, the stationary power source may be a stationary power outlet. However, the system 400 may also be connected to a mobile power source so that the system 400 may receive power even when it is not receiving power from a stationary power source. In a preferred embodiment, the system 400 comprises a battery pack and/or an engine that can provide power to the system 400 when in an environment 700. In other preferred embodiment, the system 400 may be capable of using multiple types of power supplies 122.

Figure 4:
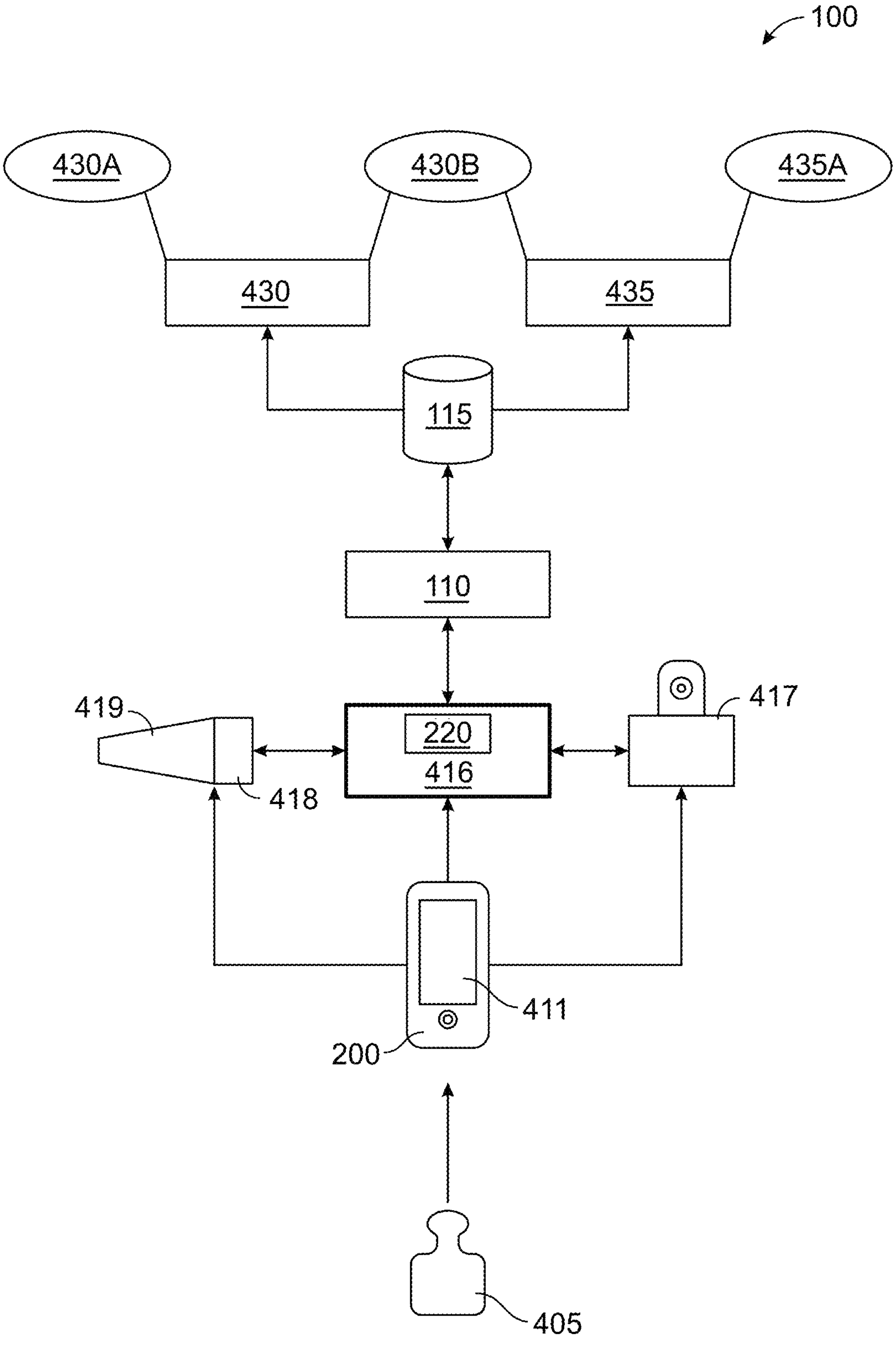
FIG. 4 illustrates a system in which techniques described herein may be implemented.
Figure 5:
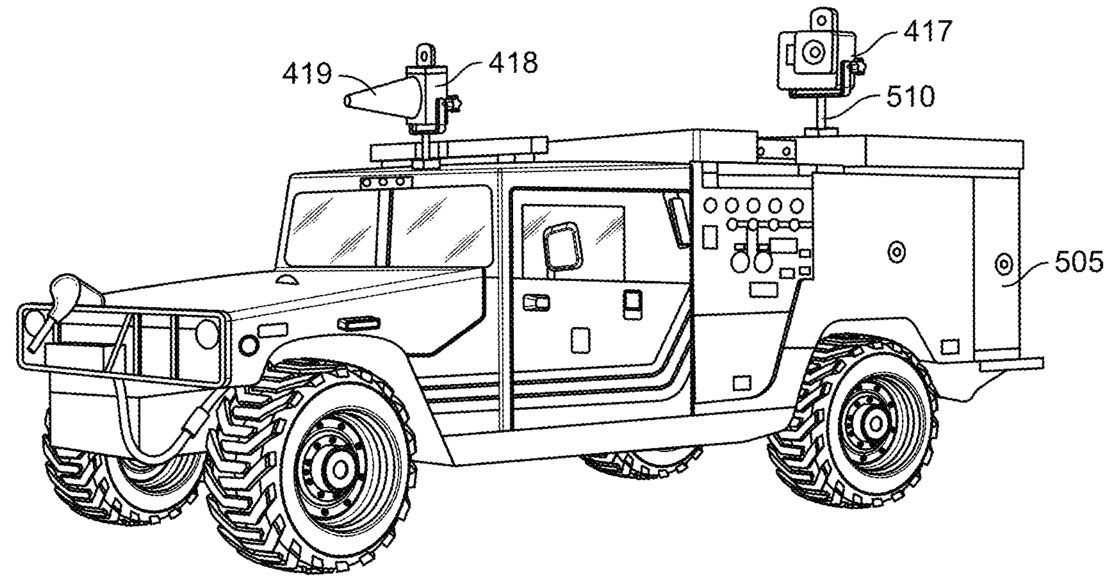
FIG. 5 illustrates a perspective view of a system attached to a vehicle in which techniques described herein may be implemented.
Figure 6:
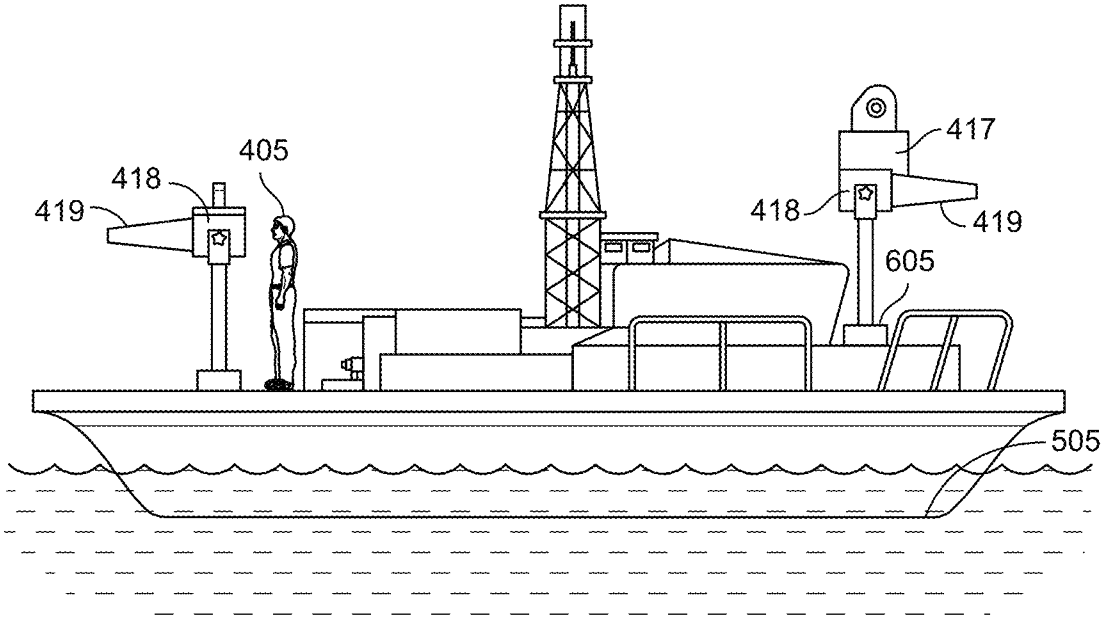
FIG. 6 illustrates a perspective view of a system in which techniques described herein may be implemented.
Figure 7:
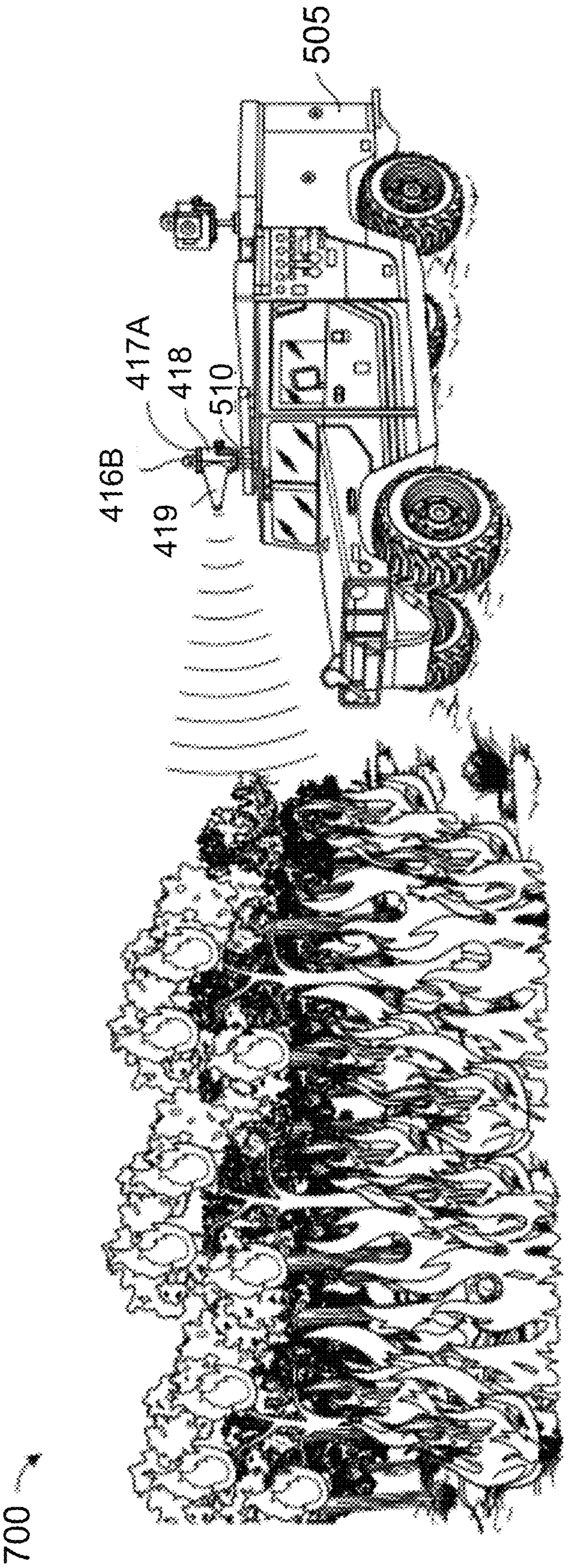
FIG. 7 illustrates an environmental view of a system in which techniques described herein may be implemented
Figure 8:
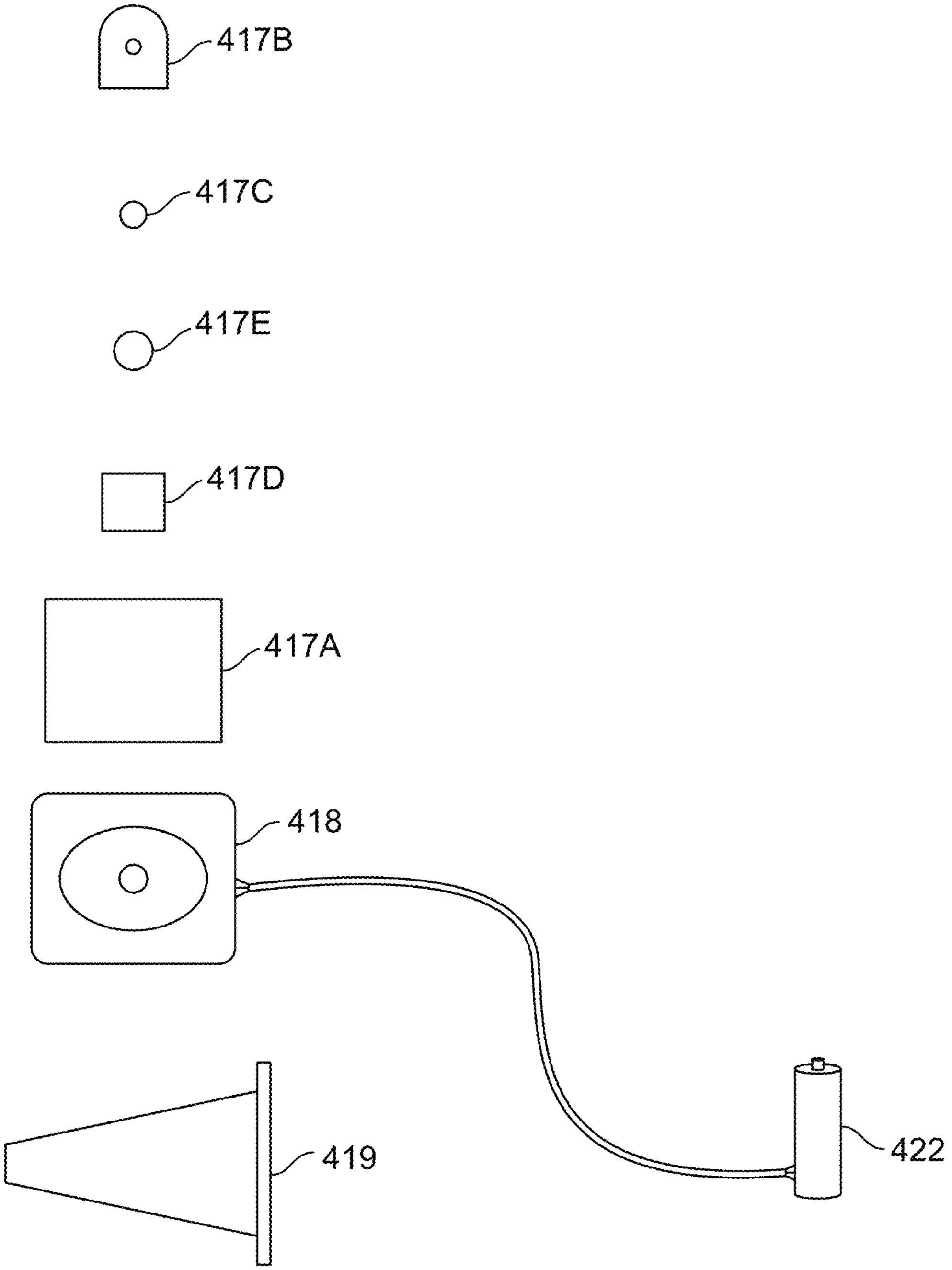
FIG. 8 illustrates an exploded view of a system in which techniques described herein may be implemented.
Figure 9:
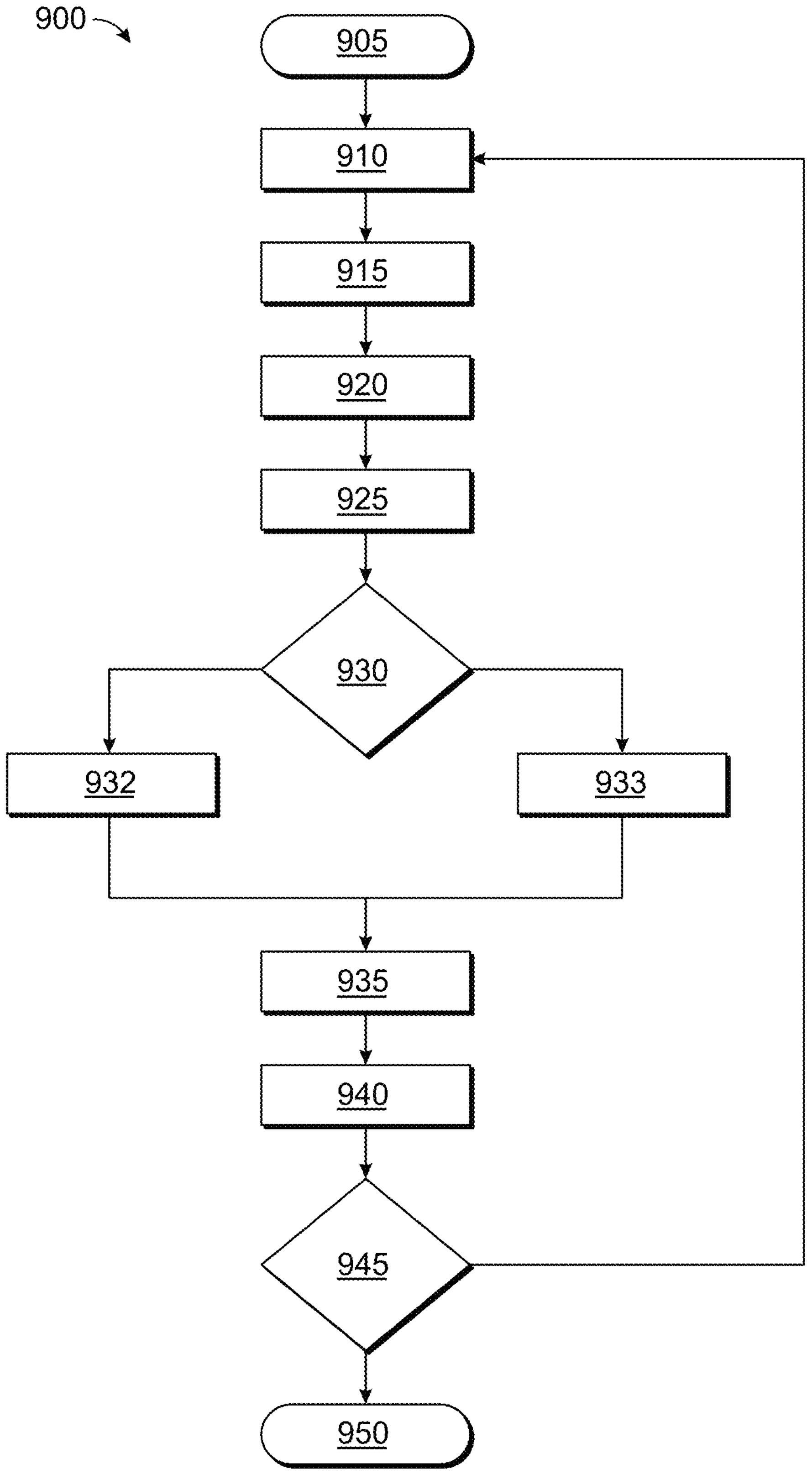
FIG. 9 illustrates a flow chart illustrating certain method steps of a method embodying features consistent with the principles of the present disclosure.

Although the system 400 and method of the present disclosure have been discussed for use within the fire management field, one of skill in the art will appreciate that the inventive subject matter disclosed herein may be utilized in other fields or for other applications in which combustion reactions must be extinguished. FIG. 4 illustrates a front perspective view of an acoustic combustion quenching device that may be used to extinguish fires via soundwaves. FIG. 5 illustrates a back-perspective view of an acoustic combustion quenching device that may be used to extinguish fires via soundwaves. FIG. 6 illustrates a blow-up view of the various components of an acoustic combustion quenching device that may be used to extinguish fires via soundwaves. FIG. 7 illustrates an environmental view of an acoustic combustion quenching device operably connected to a vehicle 505, wherein said acoustic combustion quenching device and vehicle 505 are configured to combat wildfires within an environment 700. FIG. 8 illustrates an exploded view of an acoustic combustion quenching device. FIG. 9 illustrates a method that may be carried out by a user 405 using the acoustic combustion quenching device to extinguish a fire. It is understood that the various method steps associated with the methods of the present disclosure may be carried out as operations by the system 400 shown in FIG. 4.

FIGS. 4-9 illustrate embodiments of a system 400 and its various methods for extinguishing combustion reactions. As illustrated in FIGS. 1 and 6, the system 400 generally comprises a camera 417, output device 418, waveguide 419, processor 220, power supply 122, and a non-transitory computer-readable medium (CRM) 416 having instructions stored thereon that instruct the processor 220 to perform operations of the system 400. In one preferred embodiment, the system 400 may further comprise a database 115 operably connected to the processor 220. In another preferred embodiment, a server 110 may be operably connected to the database 115 and processor 220, facilitating the transfer of information between the processor 220 and database 115. In yet another preferred embodiment, as illustrated in FIGS. 2 and 3, a mounting device 510 may be used to secure the various components to a vehicle 505. Although represented as a single mounting device 510, camera 417, CRM 416, processor 220, and display 316, it is understood that the system 400 may comprise of a plurality of mounting devices 510, cameras 417, output devices 418, waveguides 419, processors 220, power supplies 122, and non-transitory computer-readable mediums 416. In some preferred embodiments, as illustrated in FIG. 4, the system 400 may comprise a computing entity 200 having a user interface 411, which may present, to a user 405, data that may inform the user 405 about a particular combustion reaction. In other preferred embodiments, the user interface 411 may also allow a user 405 to control the system 400 remotely.

The camera 417 is configured to capture image data 435 of an environment 700 in which a combustion reaction is taking place. The image data 435 may contain images relating to controlled, uncontrolled, and partially controlled combustion reactions. In a preferred embodiment, the controlled and partially controlled combustion reactions are manipulated using soundwaves directed at the combustion reactions by the system 400, which limit or stop the rate in which combustion may take place. In a preferred embodiment, as illustrated in FIG. 5, the camera 417 may comprise a housing, lens 417C, digital sensor 417D, and filter 417E. The lens is configured to focus light received from an environment 700 onto the digital sensor 417D. The digital sensor 417D is configured capture the light directed onto it by the lens and transform said captured light into image data 435. The filter 417E is configured to limit the type of light that may be captured by the lens 417C and directed to the digital senor. The housing is configured to protect the various components of the camera 417. In one preferred embodiment, the housing may comprise a main shell 417A and lens shell 417B, wherein the lens shell 417B is configured in a way such that it may rotate about the main shell 417A. In some preferred embodiments, this may allow the lens 417C to capture light in an area up to 360 degrees about the main shell 417A, which may then be converted by the digital sensor 417D into image data 435.

As shown best in FIG. 8, the housing is preferably made of a durable heat-resistant material such as polybenzimidazole, though one of skill in the art will readily appreciate that other suitable heat-resistant materials may be used without departing from the inventive subject matter disclosed herein. The main shell 417A may have rectangular cube-like shape, but it is understood that the main shell 417A may be shaped in any manner suitable for encasing the various components of the camera 417. As illustrated in FIG. 8, the main shell 417A comprises a front panel, back panel, side panels, bottom panel, and top panel. In one preferred embodiment, the main shell 417A is designed to interlock or otherwise secure to a mounting device. As mentioned previously, some embodiments of the housing may comprise a lens shell 417B. In a preferred embodiment, the lens shell 417B may comprise a curved body attached to a bottom panel, wherein the curved body is configured to enclose the lens 417C, digital sensor 417D, and filter 417E. However, one of skill in the art will readily recognize that the lens shell 417B may retain any shape suitable for encapsulating the lens 417C, digital sensor 417D, and filter 417E in the manner disclosed herein. An aperture of the curved body may allow the lens 417C to receive light from an environment 700 and direct it to the digital sensor 417D within. The lens shell 417B is preferably moveably attached to the main shell 417A in a way such that the lens shell 417B may rotate in the various manners disclosed herein. To permit the camera 417 to capture clear video of the environment 700 in which it is disposed, some embodiments of the housing may be transparent. In some preferred embodiments, the base of the housing may be configured to secure to the main shell 417A to establish an airtight seal, which may prevent moisture and/or heat from damaging the components of the camera 417.

The lens 417C and/or lens shell 417B may be configured to rotate about an x-axis, y-axis, and/or z-axis. In preferred embodiment, the lens 417C and/or lens shell 417B may rotate in the foregoing manner in response to user interaction with a display 316, as disclosed herein, thereby enabling users 405 to remotely control the camera 417 and, therefore, the image data 435 captured by the system 400. The lens 417C and/or lens shell 417B are preferably constructed so that at least one filter 417E may be attached thereto. The filter 417E is preferably configured to filter out certain types of light before it reaches the digital sensor 417D. The filter 417E may be configured to be manually attached by a user 405 to the camera 417 such that the filter 417E covers the lens 417C and/or lens shell 417B and then must be manually removed by said user 405. Alternatively, the filter 417E may be secured to the camera 417 in a way such that users 405 may manipulate a user interface 411 to cause the system 400 to apply at least one filter 417E to the lens 417C and/or lens shell 417B automatically. For instance, the camera 417 may comprise multiple filters 417E attached to gear mechanism and electric motor. By choosing a particular filter 417E via the user interface 411, a user 405 may cause the camera 417 processor 220 to activate the electric motor and turn the gear mechanism, which in turn may rotate the filters 417E attached to said gear mechanism and change the filter 417E applied to the lens 417C and/or lens shell 417B.

In some preferred embodiments, the camera 417 may further comprise a camera 417 processor 220. The camera 417 processor 220 may be configured to perform the operations disclosed herein based on programming instructions stored within a CRM 416 coupled to the camera 417 processor 220 and may be any processor or microprocessor suitable for executing such program instructions. In some preferred embodiments, the camera 417 processor 220 is optimized to manipulate image data 435 captured by the digital sensor 417D. For instance, the digital sensor 417D may be configured to capture multiple pieces of image data 435 at different exposures in quick succession, allowing the camera 417 processor 220 to combine said pieces of image data 435 into a single piece of image data 435 that may be sharper than a single piece of image data 435 at a single exposure. For instance, the camera 417 processor 220, in combination with a gyroscope and accelerometer, may use digital image stabilization to reduce the amount of noise by calculating the effect of the camera 417*s* movement to adjust which pixels on the digital sensor 417D are activated, thus reducing blur in an image. Once the image data 435 has been manipulated by the camera 417 processor 220, the image data 435 may be transmitted to the processor 220 of the system 400 so that it may determine any heat reduction 430 that may have occurred to the combustion reaction being acted upon by the system 400, wherein the system 400 may subsequently modulate soundwaves to further manipulate said combustion reaction in a way that causes an additional reduction in heat. This may require that require that the image data 435 comprises a temporal data 435A component that may allow the system 400 to determine heat reduction 430 based on a difference in flame height 430B.

In a preferred embodiment, when the processor 220 receives image data 435 from the camera 417, the processor 220 may calculate the difference in the flame height 430B of a first piece of image data 435 having a first temporal point to the flame height 430B of a second piece of image data 435 having a second temporal point. This may allow the system 400 to approximate the reduction in heat release based on a given frequency at a given distance. The processor 220 may then modulate the frequency and intensity of the soundwaves emitted from the output device 418 such that the system 400 may maximize the amount of heat reduction 430 caused by the system 400. In another preferred embodiment, the processor 220 may receive environmental data 430A from the system 400 that may allow the processor 220 to calculate how to modulate the frequency and intensity of the soundwaves emitted by the output device 418. The processor 220 preferably receives environmental data 430A from at least one senor operably connected to said processor 220. Types of sensors that may be used as an at least one sensor include, but are not limited to, thermometer, humidity sensor, passive infrared sensor, light sensor, radar, wind transducer, compass, speed transducer, global positioning system (GPS), at least one gyroscope, at least one accelerometer, at least one barometer, or any combination thereof. Therefore, the at least one sensor may measure a variety of types of environmental data 430A and transmit that data to the processor 220 such that the processor 220 may determine in what way to modulate the frequency and intensity of soundwaves so that said soundwaves manipulate a combustion reaction being acted upon by said system 400.

Alternatively, the system may estimate the probability of flashover during an indoor fire by performing a Monte Carlo simulation using the McCaffrey, Quintiere, Harkleroad Correlation (MQH). The MQH correlation is defined by the following equation:

$$\frac{\Delta T}{T_\infty} = K\left(\frac{\dot{Q}}{\rho_\infty C_{p,\infty} A_o \sqrt{gH_o}\, T_\infty}\right)^{\frac{2}{3}}\left(\frac{h_w A_w}{\rho_\infty C_{p,\infty} A_o \sqrt{gH_o}}\right)^{\frac{-1}{3}}$$

Where ΔT=Change in Temperature of the Hot Gas Layer, $T_\infty$=Ambient Temperature, K=Location Constant, Q=Peak Heat Release Rate, $C_{p,\infty}$=Specific Heat Capacity of Air (ambient condition), $\rho_\infty$=Density of air (ambient condition), $A_o$=Area of openings into the room, g=Gravitational Acceleration, $H_o$=Height of openings into the room, $A_w$=Surface area of the room walls, and $h_w$=heat transfer coefficient for surfaces of the room. A Monte Carlo simulation that defines at least eight of the variables for a typical living room will be generated to populate the MQH correlation. These variables include, but are not limited to, the location factor, flashover temperature, width and height of wall openings, floor area, ceiling height, thickness of the wall, and the room aspect ratio. In a preferred embodiment, the minimums, maximums, and mean values for the random variables will be generated from known data that were either previously published or have become known to the system over time via artificial intelligence techniques. Other variables may be derived from said random variables, previously published data (in the case of ambient conditions), and/or artificial intelligence techniques. Data may be input into the system by a user using an input device or may be obtained by at least one sensor of the system.

When the MQH correlation has been established, the system may compare hot gas layer, determined in the correlation, to the estimated flashover temperature generated from the Monte Carlo simulation. If the system determines that the temperature of the hot gas layer exceeds the estimated flashover temperature, the system may output a computer readable signal that will notify the user that a flashover will occur. In another preferred embodiment, a second Monte Carlo simulation, using a reduced heat release rate determined using the change in flame height method described above, will quantify a new MQH value for the same indoor space but with acoustic waves first applied to the fire. This will result in a new flashover probability value, which is to be compared to the original fire. Based on this calculation, the system may modify the frequency and intensity of the soundwaves to maximize the amount of heat reduction that occurs. In some preferred embodiments, the values may be presented to the user via the display, allowing the user to manually change the frequency and intensity of the soundwaves as needed.

In a preferred embodiment, the system 400 may use artificial intelligence (AI) techniques to control the system in a way to cause a reduction in heat in a combustion reaction. The term "artificial intelligence" and grammatical equivalents thereof are used herein to mean a method used by the system 400 to correctly interpret and learn from data of the system 400 or a fleet of systems 400 in order to achieve specific goals and tasks through flexible adaptation. Types of AI that may be used by the system 400 include, but are not limited to, machine learning, neural network, computer vision, or any combination thereof. The system 400 preferably uses machine learning techniques to learn how to interpret image data and environmental data as well as how to modulate the frequency output by the output device 418 to maximize a heat reduction within a combustion reaction, wherein the instructions carried out by the processor 220 for said machine learning techniques are stored on the CRM 416. Machine learning techniques that may be used by the system 400 include, but are not limited to, regression, classification, clustering, dimensionality reduction, ensemble, deep learning, transfer learning, reinforcement learning, or any combination thereof.

The system 400 may use more than one machine learning technique to autonomously seek out and create a heat reduction in a combustion reaction using sound waves. For instance, the system 400 may use a combination of natural language processing and reinforcement learning to learn what instructions a user 405 is giving the system and deduce the most efficient method in which it can cause the system to carry out those instructions. For instance, a user may verbally give the system instructions to protect a team of fire fighters as they attempt to control a wildfire, and the system may interpret said verbal instructions, monitor the fire, determine the point of the fire that represents the biggest threat to said team of fire fighters, and prevent flashover from overwhelming said team of fire fighters using soundwaves. Machine learning techniques may also be used to coordinate an attack on a combustion reaction in order to more safely and efficiently control the combustion reaction. In one preferred embodiment, a plurality of systems 400 may monitor the combustion reaction from several points and coordinate a control scheme that may be adjusted in real time. This control scheme may be transmitted to a computing device of a fire fighter of a team of fire fighters to assist their attempts to stop the combustion reaction. For instance, the system 400 may use supervised deep learning combined with results from computer-aided detection to deduce that additional support is needed to control a combustion reaction. Therefore, the system may call for additional fire fighters, air support, emergency medical assistance, etc. if it believes such support is necessary. Over time, the system 400 may obtain more knowledge about combustion reactions and the various variables used to predict behavior of said combustion reaction, allowing it to make more intelligent decisions about how to best control combustion reactions.

In a preferred embodiment, the programming instructions responsible for the operations carried out by the processor 220 are stored on a non-transitory computer-readable medium 416 that is coupled to the processor 220, as shown in FIG. 4. In some instances, the programming instructions responsible for the operations carried out by the camera 417 processor 220 may be stored within the CRM 416 coupled to the processor 220. Examples of CRMs 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the CRM 416.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS. The database 115 may be operably connected to the processor 220 via wired or wireless connection. In a preferred embodiment, the database 115 is configured to store data within. The database 115 may be a relational database such that the data associated with a combustion reaction may be stored, at least in part, in one or more tables. Alternatively, the database 115 may be an object database such that data associated with each combustion reaction are stored, at least in part, as objects. In some instances, the database 115 may comprise a relational and/or object database 115 and a server 110 dedicated solely to managing the combustion reaction data described herein.

In a preferred embodiment, the camera 417 may be fastened to a mounting device 510 to facilitate securement of the camera 417 in a fixed position to a vehicle 505. The camera 417 may have a filter 417E designed to capture infrared image data 435 that the processor 220 may use to determine if a heat reduction 430 has occurred. Accordingly, by mounting a first camera 417 to a first location using a conventional image capturing lens and a second camera 417 at a second position having a filter 417E configured to capture infrared image data 435, the system 400 may obtain thermal data of a combustion reaction in multiple forms, which the system 400 may then use to modulation of the frequency and intensity of the soundwaves emitted from the output device 418. Additionally, cameras 417 comprising various lenses 417C and filters 417E may grant users 405 vision in environments 700 where a lens 417C configured to capture visible light might produce imaged data having limited visibility due to smoke or other obstructions. Thus, in this way, the system 400 of the present disclosure may enable users 405 to effectively navigate and control combustion reactions in a safer manner than what is currently practiced within the art.

In another preferred embodiment, the system 400 of the present disclosure may be configured in a way such that the camera 417 and/or waveguide 419 may be secured in fixed positions to a vehicle 505 and/or object. Surfaces and/or objects that a camera 417 may be secured to include, but are not limited to, roofs, decks, roll cages, doors, or any combination thereof. To facilitate mounting of the camera 417 and/or waveguide 419 in fixed positions at a desired location on said vehicle 505 and/or object, the camera 417 and/or waveguide 419 are preferably secured to at least one mounting device 510. In a preferred embodiment, the mounting device 510 may be a gimbal having 2-axis or 3-axis movement that may prevent unwanted wobbling during the recording of image data 435 or while directing soundwaves to a particular location of a combustion reaction. This may reduce unwanted movement of the camera 417 and/or waveguide 419 when the system 400 is in use, which may result in higher quality image data 435 and increase the ability of the system 400 to manipulate combustion reactions. FIGS. 2 and 4 illustrate a mounting device 510 configured to interlock with or otherwise secure to the camera 417 and/or waveguide 419 to a roll cage of a vehicle 505. Alternatively, the mounting device 510 may have an extension arm and be configured to mount to a surface of a vehicle 505, as illustrated in FIG. 6, in a way such that the camera 417 and or waveguide 419 may be secured to a fixed position on the vehicle 505 at an elevated position.

FIG. 6 depicts a mounting device 510 further comprising a mount turret 605. The mount turret 605 allows a mounting device 510 to be more securely fixated to the surface of a vehicle 505 anywhere the mount turret 605 is secured. As depicted in FIG. 6, the mounting device 510 is attached an extension arm of the mounting device 510. Alternatively, the mount turret 605 may attach to the camera 417 and/or waveguide 419. The mount turret 605 may comprise a flat and square shaped section in contact with a surface of the vehicle 505, though it is understood that the mount turret 605 may comprise a plurality of shapes and sizes and still fall within the scope of the present disclosure. As illustrated in FIG. 6, the mount turret 605 may have a plurality of openings therein through which screws, bolts, nails, or other suitable fastening instruments or devices may pass through to secure the mount turret 605 to a desired surface or object present on a vehicle 505. However, one of skill in the art will readily appreciate that the mount turret 605 may be secured to the surface of a vehicle 505 and/or object in alternative manners without departing from the inventive subject matter disclosed herein. For instance, the mount turret 605 may be secured to the surface of a fireboat using heat resistant adhesives.

In some preferred embodiments, the mounting device 510 may be configured to allow for the rotation of the components about said mounting device 510. In one preferred embodiment, system 400 may be configured such that a user 405 may manually control the direction in which the waveguide 419 directs soundwaves, as illustrated in FIG. 6. This configuration may still allow the system 400 to gather data, which may be used to make recommendations to a user 405 as to the best tactic to cause a heat reduction 430. For instance, a user interface 411 may instruct a user 405 to reduce the frequency of soundwaves from 150 hertz to 90 hertz to cause the greatest reduction in heat. For instance, a user 405 may rotate the system 400 about a pivot of the mounting device 510 using handles connected to the waveguide 419, wherein said camera 417 is positioned on said waveguide 419 in a way such that movement of said waveguide 419 by said user 405 may allow said camera 417 to capture image data 435 in a direction generally toward the area in which said waveguide 419 is directing soundwaves. In other preferred embodiments, an electric motor and gear mechanism may allow a user 405 to remotely control and rotate the system 400 about the pivot. For instance, a user 405 may remotely point the camera 417 and waveguide 419 toward a combustion reaction via the user interface 411.

A user interface 411 may be defined as a space where interactions between a user 405 and the system 400 may take place. In an embodiment, the interactions may take place in a way such that a user 405 may control the operations of the system 400. A user interface 411 may include, but is not limited to operating systems 400, command line user interfaces 411, conversational interfaces, web-based user interfaces, zooming user interfaces, touch screens, task-based user interface, touch user interface, text-based user interface, intelligent user interface, and graphical user interface, or any combination thereof. The system 400 may present data of the user interface 411 to the user 405 via a display 316 operably connected to the processor 220. A display 316 may be defined as an output device 418 that communicates data that may include, but is not limited to, visual, auditory, cutaneous, kinesthetic, olfactory, and gustatory, or any combination thereof.

In a preferred embodiment, the display 316 receives the user interface 411 from the camera 417 processor 220 and/or processor 220 and presents it to a user 405. The image data 435 and camera 417 modules may be presented to the user 405 via the user interface 411. In another preferred embodiment, the user interface 411 may also comprise controls, which may allow a user 405 to manually control the frequency and intensity of soundwaves emitted by the system 400. The processor 220 may manipulate the frequency and intensity of soundwaves based on commands received from an input device. In a preferred embodiment, the input device communicates commands to the processor 220, which the processor 220 uses to manipulate the frequency and intensity of soundwaves. Indicia within the control window may be used to indicate a module that will be executed by the processor 220 and/or camera 417 processor 220. In a preferred embodiment, indicia used within the control window indicate the filter 417E, wave intensity, and wave frequency used by the system 400. In another preferred embodiment, indicia may be used to indicate the direction in which the system 400 may focus the lens 417C to capture image data 435 and/or the direction in which the system 400 may direct the soundwaves. For instance, a user 405 may manipulate the input device in way that commands the processor 220 to select an indicia representing a module that will instruct the processor 220 to turn a gear mechanism of a vehicle 505 attached to a waveguide 419 in a way that directs the soundwaves in a new direction without also requiring the vehicle 505 to be turned in said new direction.

As provided above, the display 316 is configured to receive image data 435 of the environment 700 from the camera 417 and display said image data 435 to a user 405. The image data 435 captured by the camera 417 may be directed to a processor 220 connected thereto before being displayed on the display 316 for user review. The camera 417 and display 316 may be operably connected to the processor 220 via a wireless, such as Bluetooth, or a wired connection. The display 316 may be any screen suitable for displaying a video feed from the camera 417. As such, a display 316 may be a mounted television, computer monitor, smartphone, tablet computer, VR goggles, or any combination thereof. However, one with skill in the art will recognize that other such devices may be used as the display 316 without departing from the inventive subject matter herein.

In a preferred embodiment, the display 316 may be interactive such that users 405 may interact with the user interface 411 of the display 316 to manipulate the camera 417 and/or waveguide 419. For instance, the system 400 may be designed such that a user 405 may interact with the user interface 411 of the display 316 in a way that directs the system 400 to rotate the camera 417 about a horizontal axis and/or vertical axis, switch between filtered and non-filtered views, or to control various other functions of the camera 417. In some preferred embodiments, the system may comprise one or more input devices that users 405 may manipulate in order to control the camera 417 and/or waveguide 419 in the manners described herein. The one or more controllers may include, but are not limited to, keyboards, mouses, joysticks, haptic gloves, or combinations thereof. In some instances, the display 316 may include a touchscreen display 316.

In a preferred embodiment, user interaction with the display 316 generates input data which may be transmitted to and subsequently processed by the processor 220. Upon processing the input data, the processor 220 may transmit a series of instructions to the camera 417 processor 220, which, when read and executed thereby, causes the camera lens 417C and or the lens shell 417B to be manipulated in the manner prescribed by the user 405 through the user's interaction with the display 316. Input data generated by user interaction with the display 316 may be processed in a similar manner to manipulate the output device 418 and/or mounting device 510. Accordingly, in some embodiments, the output device 418 and/or mounting device 510 may be operably connected to the camera 417 processor 220. Alternatively, the output device 418 and/or mounting device 510 may further comprise processors 220 of their own configured to receive instructions from processor 220 and execute the same to manipulate the direction of or adjust the intensity/frequency of soundwaves in the manner prescribed by a user 405.

Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored in RAM. For instance, a display 316 may present a soft copy of tactile information via a haptic suit, wherein the hard copy of the tactile information is stored within a database. Displays 316 may include, but are not limited to, cathode ray tube monitors, LCD monitors, light emitting diode (LED) monitors, gas plasma monitors, screen readers, speech synthesizers, haptic suits, virtual reality headsets, speakers, and scent generating devices, or any combination thereof.

FIG. 9 provides a flow chart 900 illustrating certain, preferred method steps that may be used to carry out the method of modulating the frequency of a soundwave to manipulate a combustion reaction. Step 905 indicates the beginning of the method. During step 910, the processor 220 may receive image data 435 containing a first image data 435 having a first temporal point and a first frequency, wherein said first image data 435 contains image of a combustion reaction. The processor 220 may then receive image data 435 containing a second image data 435 having a second temporal point and second a second frequency of a combustion reaction during step 915, and subsequently calculate a flame height 430B of a flame within the first image data 435 and second image data 435 during step 920. Once the flame height 430Bs have been determined, the processor 220 may perform a query during step 925 to determine if there was a heat reduction 430. In a preferred embodiment, the system 400 may determine a heat reduction 430 by comparing the flame height 430B in the first image data 435 to that of the flame height 430B in the second image data 435.

Based on the results of the query, the processor 220 may perform and action during step 930. If the processor 220 determines that a heat reduction 430 occurred, the processor 220 may change the frequency to the frequency affecting the flame height 430B within the second image data 435 during step 932. If the processor 220 determines that a heat increase occurred, the processor 220 may change the frequency to the frequency affecting the flame height 430B within the first image data 435 during step 933. In some preferred embodiments, the system 400 may also modulate the intensity of a soundwave in the same manner as it may modulate the frequency. Once the frequency of the soundwave has been changed, the system 400 may obtain image data 435 from the camera 417 during step 935 and subsequently perform a query during step 940 to determine if the combustion reaction has been stopped. Based on the results of the query, the processor 220 may take an action during step 945. If the processor 220 determines that the combustion reaction has not been stopped, the processor 220 may proceed to step 910. If the processor 220 determines that the combustion reaction has been stopped, the processor 220 may proceed to terminate method step 950.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system for manipulating combustion reactions comprising:

a camera configured to obtain first image data and second image data of an environment, wherein said first image data and said second image data depict a flame of a combustion reaction in said environment, wherein said first image data depicts said flame of said combustion reaction having a first flame height, wherein said second image data depicts said flame of said combustion reaction having a second flame height, wherein said first image data is associated with a first temporal point and said second image data is associated with a second temporal point, wherein said first temporal point is a point in time immediately prior to application of a soundwave, wherein said second temporal point is a point in time immediately after application of said soundwave, a processor operably connected to said camera, wherein said processor is configured to receive said first image data and said second image data from said camera, an output device operably connected to said processor, wherein said output device is configured to emit said soundwave, wherein a first soundwave emitted by said output device comprises a first frequency and a first intensity, wherein a second soundwave emitted by said output device comprises a second frequency and a second intensity, wherein said processor alters at least one of said first frequency and said first intensity of said first soundwave to create said second soundwave that is output by said output device, wherein said first soundwave and said second soundwave are not simultaneously output by said output device, wherein said first soundwave is output after said first temporal point and before said second temporal point, wherein said second soundwave is output after said second temporal point, wherein said second soundwave is optimized to create a heat reduction in said combustion reaction, a waveguide connected to said output device, wherein said waveguide directs said soundwave generated by said output device towards said combustion reaction in said environment, a vehicle having an exterior mounting device, wherein said camera, output device, and waveguide are operably connected to said vehicle via said exterior mounting device, and a non-transitory computer-readable medium coupled to said processor, wherein said non-transitory computer-readable medium contains instructions stored thereon, which, when executed by said processor, cause said processor to perform operations comprising:

receiving, from said camera, said first image data obtained at said first temporal point, transmitting a computer readable signal to said output device that causes said output device to emit said first soundwave, receiving, from said camera, said second image data taken at said second temporal point, calculating said first flame height of said flame of said combustion reaction within said first image data, calculating said second flame height of said flame of said combustion reaction within said second image data, determining a flame height difference using said first flame height and said second flame height, determining a heat reduction based on said flame height difference, wherein said heat reduction is caused by said first frequency and first intensity of said first soundwave, determining how to modulate said first soundwave to create said second soundwave based on said heat reduction in order to cause a greater heat reduction via application of said second soundwave to said combustion reaction, and modulating, through said output device, at least one of said first frequency and said first intensity of said first soundwave to create said second soundwave.

2. The system of claim 1, wherein said waveguide directs soundwaves having frequencies between 150 hertz to 90 hertz towards said combustion reaction contained within said first image data and said second image data.

3. The system of claim 1, further comprising additional instructions stored on said non-transitory computer-readable medium, which, when executed by said processor, cause said processor to perform additional operations comprising, analyzing image data, using a machine learning technique, collected by said camera to determine if additional support is needed to control said combustion reaction in said environment, and sending an alert, through a wireless communication device and a network, to emergency fire personnel when it is determined that said additional support is needed, wherein said alert includes data that informs said emergency fire personnel about said combustion reaction in said environment.

4. The system of claim 1, further comprising additional instructions stored on said non-transitory computer-readable medium, which, when executed by said processor, cause said processor to perform additional operations comprising, analyzing, using machine learning techniques, said combustion reaction using said first image data and said second image data to determine how to prevent a flashover, manipulating at least one of said vehicle, output device, and waveguide to seek out said combustion reaction, and directing one of said first soundwave or said second soundwave at said combustion reaction in order to prevent said flashover.

5. The system of claim 1, further comprising at least one input device operably connected to said processor, wherein input data received by said processor from said at least one input device allows a user to manipulate a direction of at least one of said output device, camera, vehicle, and waveguide via said exterior mounting device.

6. The system of claim 5, further comprising a user interface, wherein a user inputs said input data into said user interface via said at least one input device in order to manipulate at least one of said output device, camera, vehicle, and waveguide via said exterior mounting device.

7. The system of claim 6, wherein said user interface is configured to present input data pertaining to said first soundwave and said second soundwave via a display, wherein said input data of said first soundwave comprises a first frequency and a first intensity, wherein said input data of said second soundwave comprises a second frequency and a second intensity.

8. The system of claim 7, wherein said processor manipulates said output device, camera, vehicle, and mounting device in a way that causes said camera and said vehicle to autonomously seek out said combustion reaction within said environment and causes said output device and said mounting device to autonomously modulate said first soundwave to create said second soundwave in order to cause said heat reduction in said combustion reaction.

9. The system of claim 1, further comprising at least one sensor operably connected to said processor, wherein said at least one sensor is configured to collect environmental data from an environment in which said combustion reaction is present.

10. The system of claim 9, further comprising additional instructions stored on said non-transitory computer-readable medium, which, when executed by said processor, cause said processor to perform additional operations comprising, receiving said environmental data from said at least one sensor, and determining said heat reduction using said first flame height, second flame height, and said environmental data.

11. The system of claim 9, further comprising additional instructions stored on said non-transitory computer-readable medium, which, when executed by said processor, cause said processor to perform additional operations comprising, receiving said environmental data from said at least one sensor, determining a first flashover probability of said combustion reaction using said environmental data and a McCaffrey, Quintiere, Harkleroad (MQH) Correlation, determining a second flashover probability of said combustion reaction using said heat reduction based on said flame height difference, comparing said first flashover probability to said second flashover probability to determine a flashover probability reduction, and adjusting at least one of said first frequency and said first intensity to increase said flashover probability reduction.

12. A system for manipulating combustion reactions comprising:

a camera configured to obtain first image data and second image data of an environment, wherein said first image data and said second image data depict a flame of a combustion reaction in said environment, wherein said first image data depicts said flame of said combustion reaction having a first flame height, wherein said second image data depicts said flame of said combustion reaction having a second flame height, wherein said first image data is associated with a first temporal point and said second image data is associated with a second temporal point, wherein in said first temporal point is a point in time immediately prior to application of a soundwave, wherein said second temporal point is said point in time immediately after application of said soundwave, a processor operably connected to said camera, wherein said processor is configured to receive said first image data and said second image data from said camera, an output device operably connected to said processor configured to emit said soundwave as a first soundwave and a second soundwave, wherein said output device is configured to emit said first soundwave and said second soundwave, wherein a first frequency and a first intensity of said first soundwave is altered by said processor to create said second soundwave having a second frequency and a second intensity, wherein said first soundwave and said second soundwave are not simultaneously output by said output device, wherein said first soundwave is output after said first temporal point and before said second temporal point, wherein said second soundwave is output after said second temporal point, wherein said second frequency and said second intensity of said second soundwave is optimized to create a heat reduction in said combustion reaction, at least one sensor operably connected to said processor and configured to collect environmental data pertaining to said combustion reaction, and a non-transitory computer-readable medium coupled to said processor, wherein said non-transitory computer-readable medium contains instructions stored thereon, which, when executed by said processor, cause said processor to perform operations comprising:

receiving, from said at least one sensor, said environmental data, receiving, from said camera, said first image data obtained at said first temporal point, transmitting a computer readable signal to said output device that causes said output device to emit said first soundwave, receiving, from said camera, said second image data taken at said second temporal point, calculating said first flame height of said flame of said combustion reaction within said first image data, calculating said second flame height of said flame of said combustion reaction within said second image data, determining a first flashover probability of said combustion reaction using said environmental data, determining a flame height difference using said first flame height and said second flame height, determining a second flashover probability of said combustion reaction using said heat reduction based on said flame height difference, comparing said first flashover probability to said second flashover probability to determine a flashover probability reduction, and adjusting at least one of said first frequency and said first intensity to create a further said flashover probability reduction.

13. The system of claim 12, further comprising a waveguide connected to said output device, wherein said waveguide directs said first soundwave and said second soundwave generated by said output device towards said flame of said combustion reaction contained within said first image data and said second image data.

14. The system of claim 13, further comprising a vehicle and an exterior mounting device, wherein at least one of said camera and said waveguide are operably connected to said vehicle via said exterior mounting device.

15. The system of claim 14, wherein input data received by said processor from at least one input device allows a user to manipulate at least one of said camera, vehicle, and exterior mounting device in addition to said output device.

16. The system of claim 15, further comprising additional instructions stored on said non-transitory computer-readable medium, which, when executed by said processor, cause said processor to perform additional operations comprising, analyzing, using machine learning techniques, said combustion reaction using said first image data and said second image data to determine how to prevent a flashover, manipulating at least one of said vehicle, output device, and waveguide to seek out said combustion reaction, and directing said soundwave at said combustion reaction in order to prevent said flashover.

* * * * *